United States Patent Office 3,424,714
Patented Jan. 28, 1969

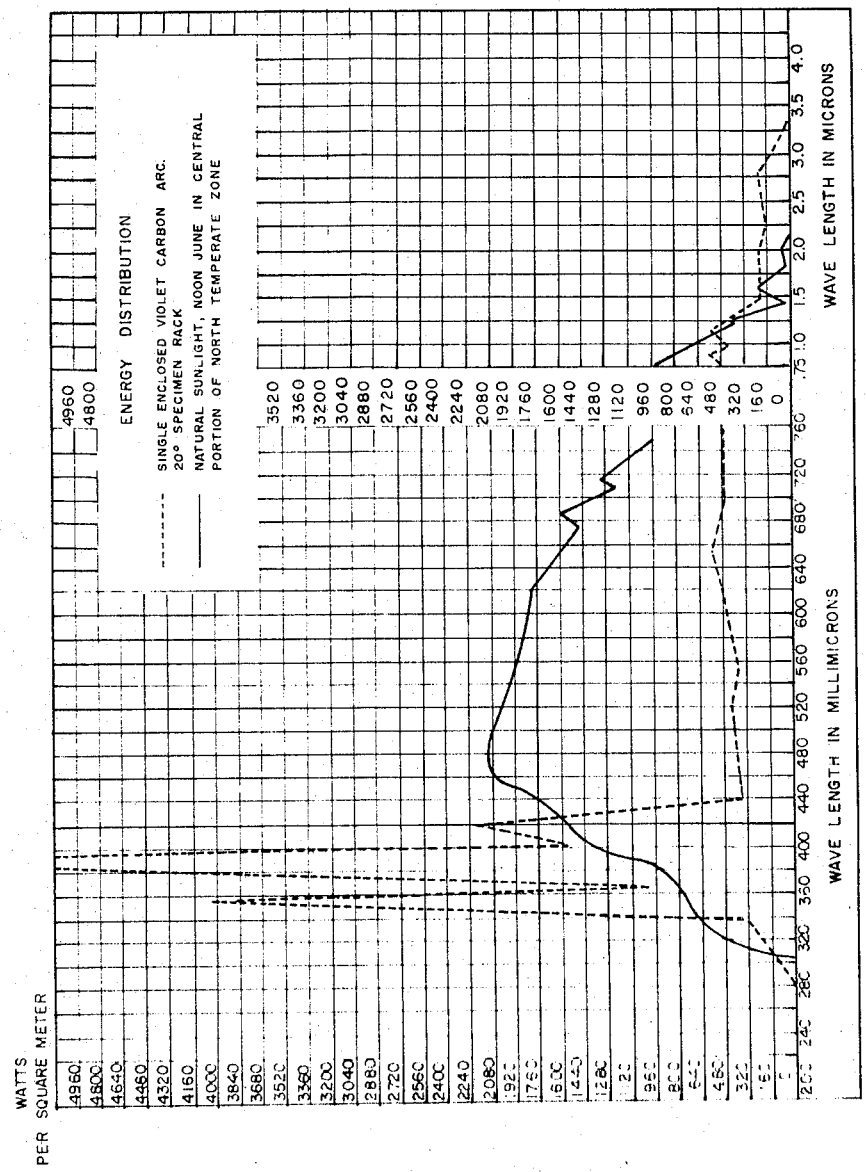

3,424,714
METHACROLEIN POLYMER STABILIZED WITH A BENZOPHENONE
Harry D. Anspon, Kansas City, Mo., and Wayne E. Smith, Shawnee, Kans., assignors to Gulf Oil Corporation, Pittsburgh, Pa., a corporation of Pennsylvania
Filed Sept. 16, 1964, Ser. No. 396,844
U.S. Cl. 260—45.95                 4 Claims
Int. Cl. C08f 29/26, 45/58

ABSTRACT OF THE DISCLOSURE

Substituted 2-hydroxy benzophenones added to methacrolein prior to polymerization produce clear transparent homopolymers which are stable in the presence of ultraviolet light at very high temperatures.

---

This invention relates to polymers, and more particularly to novel methacrolein polymers.

It is known that methacrolein has a tendency to undergo autopolymerization upon slight heating, on contact with oxygen or air, or on exposure to light, with increased acceleration in the polymerization occuring upon the addition of acidic, basic or free radical catalysts. However the resultant product is ordinarily an infusible, insoluble, cross-linked material which is of little or no value as a plastic. It is generally considered that these products are probably three dimensional molecules in which the vinyl unsaturation is polymerized and the polymer chains are cross-linked with each other with attendant conversion of the aldehyde groups into acetal or ether groups.

Attempts to avoid these disadvantages have involved low temperature polymerizaion, i.e., 30° C. to 80° C., of the methacrolein in a polar medium or in solutions thereof, such as in alcohols, in order to inhibit the reaction of the aldehyde groups to form cross-linked polymers, followed by recovery of the polymer from solutions as a dispersion or by precipitation therefrom. The products so obtained are frequently particulate in nature and of low molecular weight, probably resulting from chain transfer reactions. It has also been noted that although the cross-linking tendencies of the aldehyde groups have been inhibited, there nevertheless remained significant conversion of the aldehyde groups to acetal or ether groups to detract from the desirability of the polymer. In addition it was further noted that the methacrolein products obtained or formed by the heretofore known processes lacked transparency, or, if obtained or formed in transparent form, nevertheless turned into opaque or translucent solids upon exposure of any substantial duration to ultraviolet light. It is believed that this is, as for example in sunlight, due to either the tendency of the solid polymer to slowly undergo decarbonylation under the influence of ionizing radiation such as ultraviolet light or to undergo acetal formation. Thus, even if a clear and transparent polymer could be obtained, it nevertheless underwent chemical changes on exposure to ultraviolet light, such as encountered in outdoor use, transforming it into either an opaque or a translucent form. This sensitivity to ultraviolet light and this tendency toward degradation of the polymer on prolonged outdoor exposure constitutes an additional serious disadvantage preventing any significant commercial application of it.

In addition, these prior art polymers have also been found to undergo a transformation at or below about 84° C. (183° F.) to yield opaque white materials. However, the softening point of these prior art polymers is also about 84° C.; and thus any attempt to soften these prior art polymers, by heating, for the mechanical working or shaping of them is also accompanied by this transformation which alters these polymers into opaque white materials. This added disadvantage has also prevented any commercial exploitation of these prior art polymers.

It is therefore an object of this invention to provide a novel process for the mass polymerization of methacrolein.

It is another object of this invention to prepare solid high molecular weight stable polymers of methacrolein which are transparent and soluble in one or more organic solvents.

A still further object of this invention is to prepare novel polymers of methacrolein having a dual stability against high temperature of about and over 80° C. and against ultraviolet radiation. These and other objects and advantages will become more apparent from the following detailed description thereof.

It has been discovered, in accordance with this invention, that the foregoing objects can be accomplished by incorporation in methacrolein, prior to polymerization, specifically selected materials which stabilize the final product against undergoing irreversible transformation at and above about 84° C. and at the same time stabilize the product polymer against ultraviolet radiation. In this manner, the reaction mixture containing the stabilizer is then mass polymerized below about 200° C. under correlated conditions of temperature and pressure, preferably in the presence of a free radical catalyst.

It is important that the polymerization not exceed 200° C., although it may be varied with relative freedom below this upper limit with the application of pressure. Generally, the pressures required will be merely such as to prevent the methacrolein from boiling under the reaction temperatures used. Normally, when polymerizing methacrolein below its boiling point of 68.0° C., atmospheric pressure may be employed; however, at temperatures above 68.0° C. sufficiently elevated pressures must be used to prevent vaporization of the monomer which, as will be appreciated, otherwise would leave entrapped bubbles or voids within the polymer. The absence of sufficient pressure, when polymerizing methacrolein above its boiling point, creates a major difficulty which is apparently caused by localizing overheating due to the heat of reaction. As a result, the resultant polymer will have "vapor" bubbles entrapped in it. Generally, the polymerization temperature may be defined as that which is below the boiling point of the monomer at the reaction pressure, with the temperature not exceeding 200° C. Normally, the temperature of the polymerization should be maintained below 65° C., and preferably in the range between about 30° C. to about 65° C.

A practical upper temperature limit for the polymerization appears to be about 200° C., since infrared studies indicate that at this temperature a large number of aldehyde groups, in the polymer, are transformed into acetal or ether-like groups. As a consequence the degraded product significantly changes in properties. This change from the original product can be pointedly illustrated by noting that the degraded product was found to be insoluble in all common solvents whereas the crystal clear polymer of this invention is soluble in dimethylformamide, methylene chloride and ketone solvents. However, it is also noted that the undegraded polymers of this invention have been found to be insoluble in xylene, n-heptane, carbon tetrachloride and water at room temperature.

In contrast to the tendency of the prior art polymers to undergo an irreversible transformation at or below about 84° C., polymers of this invention were found, by thermal and infrared studies, to be stable even up to temperatures of about 250° C. (482° F.) without undergoing any irreversible transformation, while retaining the properties of the polymer as originally formed in accordance with this invention. More specifically, it was found that in each case the polymers of this invention were stabilized to at least a temperature of 108° C. (206° F.) without undergoing an irreversible transformation, with the stability of the polymer dependent upon the specific stabilizer employed in accordance with this invention. Thus, depending upon the particular stabilizer selected, the polymers of this invention are rendered stable to temperatures of from 108° C. up to about 250° C., which represents a mechanical working temperature range of from 26° C. (43° F.) to about 166° C. (299° F.) above the softening point of these polymers (i.e., about 84° C.) It is also noted that the polymers of this invention are also stabilized against ultraviolet light despite severe exposure thereto.

The monomer employed in the polymerization of this invention should be at least 90% pure and otherwise free of inhibitors and impurities in order to provide polymers of exceptionally high grade. Certain impurities can apparently be tolerated in the monomer in that polymers of high transparency have been made with a 95% pure methacrolein containing 5% acetone. However, it is preferred to maintain the monomer purity at least about 98% in order to gain better control over the properties of the polymer.

Generally, the pure monomer can be obtained by conventional purification of commercially available methacrolein, such as by adsorption, distillation and the like, in order to remove polymerization inhibitors, impurities and the like. For example, the monomer can be purified (in excess of 93%) by distillation in a fractionating column having only about five theoretical plates and employing an inert atmosphere such as nitrogen or argon, or by distillation in accordance with the teachings disclosed in U.S. Letters Patent No. 3,098,798.

The use of catalysts has been found to definitely assist in the polymerization of the methacrolein to a transparent polymer product, since in the absence of a catalyst the polymerization more frequently produces a product which is an opaque-like solid. One reason for this is believed to be that the excessively long time necessary to accomplish the polymerization, in the absence of such catalysts, permits dimerization of the monomer. Any catalyst may be used which is capable of forming free radicals at the polymerization temperatures employed. However, at polymerization temperatures below about 65° C., it was found that free radical catalysts which are particularly effective are those which have a half-life of about 10 hours or less at about 80° C. Representative catalysts are azobisisobutyronitrile (AIBN), deconoyl peroxide, 2,4-dichlorobenzoyl peroxide, lauroyl peroxide, caprylyl peroxide, benzoyl peroxide, p-chlorobenzoyl peroxide, and t-butyl peroxy-isobutyrate with the first two of these, i.e., AIBN and decanoyl peroxide, being preferred catalysts. The concentration of the catalyst is not very critical, and may be varied in a relatively wide range at normal working ranges of conventional polymerization reactions. As will be evident, since methacrolein autopolymerizes, the function of the catalysts is to provide increased polymerization rates convenient for practical applications and to produce a clear transparent product. However, since the polymerization is proportional to the concentration of the catalyst, use of excessive amounts of the catalyst makes control of the polymerization temperature correspondingly difficult. In general, the concentration of the catalyst will be maintained below about 1% by weight based on the methacrolein. Normally, however, the catalyst will be maintained in the range of about 0.01 to about 0.2%, by weight, and preferably about 0.15% based on the methacrolein. As a general rule, the concentration of the catalyst need only be present in an amount effective to provide reasonable polymerization rates, with concentration of about 0.006 gm. per 10 mls. methacrolein found sufficient to provide adequate polymerization rates.

It was found that the selection of stabilizers is very critical in order to obtain the transparent polymers which are stable, both, to heat and to ultraviolet light. Stabilizers which have been found to be operative in this invention are selected substituted benzophenones. Representative of these operative stabilizers employed in this invention are 2,2'-dihydroxy-4,4'-dimethoxybenzophenone, 2-hydroxy-4-methoxybenzophenone and 2-hydroxy-4-n-octoxybenzophenone.

In general these substituted benzophenones will conform to the formula

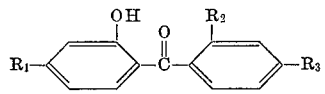

wherein $R_1$ and $R_3$ are selected from the groups consisting of the radicals hydrogen and alkoxy; and $R_2$ is selected from the group consisting of the radicals hydrogen and hydroxy, with at least one of the groups $R_1$, $R_2$ and $R_3$ being a radical other than hydrogen.

Inclusion of these stabilizers in methacrolein produces, upon polymerization, clear transparent polymers which are extremely stable in the presence of ultraviolet light, even after a minimum of 18 hours to a maximum of 35.7 hours exposure at 10" to the ultraviolet light of a single enclosed ultraviolet carbon arc in the Atlas "Weather-Ometer," Model 18–WR, having an automatic humidity control. The exposure conditions were maintained at: Air—92° F., dry bulb—92° F., wet bulb—74° F., and black plate—120° F. The severity of the ultraviolet exposure is clearly shown in the accompanying drawing which illustrates the relative distribution of the energy in exposure of natural noon sunlight in June (as encountered in the central portion of the north temperate zone), with the exposure in the "Weather-Ometer" after filtering out the short wavelengths below 275 millimicrons. The spectral distribution of the exposure and a comparative distribution of sunlight can be summarized in the following table.

| Spectral ranges in millimicrons (mm.) | Sunlight, noon, June | | Atlas "Weather-Ometer" at 10" | |
|---|---|---|---|---|
| | Watts per sq. foot | Percent of total radiation | Watts per sq. foot | Percent of total radiation |
| Below 400 mm | 6.1 | 5.9 | 33.9 | 20.3 |
| 400 mm.–700 mm | 50.9 | 49.5 | 16.2 | 9.6 |
| 700 mm.–1,400 mm | 39.1 | 38.1 | 30.2 | 18.0 |
| Above 1,400 mm | 6.7 | 6.5 | 87.1 | 52.1 |
| Total | 102.8 | 100.0 | 167.4 | 100.0 |

It is noted that reference in the examples given below and in the claims to ultraviolet exposure in the Atlas "Weather-Ometer" is hereby expressly defined as being restricted to the exposure conditions set forth above.

A stabilizer found to be particularly effective is 2,2'-dihydroxy-4,4'-dimethoxybenzophenone, in that it not only provided stabilization of the polymer to ultraviolet light, but in addition was found to provide heat stabilization at very high temperatures. A polymer containing about 1.2% of this stabilizer (based on the weight of methacrolein) was heated to 250° C. with only a trace of degradation or impairment of properties.

The concentration of the stabilizer is not critical, and can be varied over relatively wide limits and the amount for use will be dependent upon the effectiveness of the stabilizer selected. The minimum amount of any particular stabilizer required can be readily determined by ordinary laboratory procedures. The maximum amount that can be used can be varied widely, and will only be restricted by its compatibility with the polymer at the level of additive desired. Generally, about 0.1% to about 1.0% by weight (based on the methacrolein) need be used, with excellent effectiveness in stability obtained at about a 1.2% level.

As an illustration of the stable polymers obtained in accordance with this invention the following examples are set forth below:

Example I

Ten mls. of purified methacrolein was placed in a glass tube followed by addition of 0.01 gm. AIBN and 0.1 gm. of 2,2'-dihydroxy-4,4'-dimethoxybenzophenone. The tube was sealed and placed in a bath maintained at 46° C. The polymerization temperature was maintained for 48 hours at 46° C. to obtain substantially complete conversion. The polymer obtained was clear and transparent, and also was found to be resistant to degradation upon 35.7 hours exposure to ultraviolet light in the Atlas "Weather-Ometer."

In addition, samples of this polymer were heated to 95° C. without any evidence of degradation and to about 250° C. with only extremely slight discoloration and without any evidence of degradation. This stabilizer provides the preferred embodiment in that it provides the secondary function of thermal stabilization at the high temperature of 250° C.

Example II

The procedure of Example I was repeated in the polymerization of 10 mls. methacrolein again containing 0.01 gm. AIBN and 0.1 gm. of 2,2'-dihydroxy-4,4'-dimethoxybenzophenone at 46° C. for 48 hours. A clear and transparent polymer was obtained which was proved resistant to degradation upon 35.7 hours exposure to ultraviolet light in the Atlas "Weather-Ometer." The polymer was heated above 84° C. to about 120° C. without any evidence of an irreversible transformation.

Example III

In repeating the procedure of Example I, duplicate reaction mixtures, each containing 10 mls. of methacrolein, 0.01 gm. AIBN and 0.1 gm. 2-hydroxy-4-methoxybenzophenone were heated to 46° C. and the polymerization allowed to proceed for 48 hours. The resultant polymers obtained were clear and transparent, and these were subjected to a 35.7 hour exposure to ultra-violet light in the Atlas "Weather-Ometer" without any evidence of degradation. No irreversible transformation was evidenced upon heating the polymer to and above 84° C., and up to 108° C.

Example IV

In accordance with the procedure outlined in Example I, a reaction mixture was prepared containing 10 mls. of methacrolein, 0.01 gm. AIBN and 0.1 gm. of 2-hydroxy-4-n-octoxy benzophenone which was then heated to 46° C. and that temperature maintained for 48 hours. The polymer formed was clear and transparent, and proved resistant to degradation during exposure for 35.7 hours to ultraviolet light in the Atlas "Weather-Ometer." No evidence of an irreversible transformation was seen upon 20 heating the polymer up to about 108° C.

Although the foregoing examples have been described with reference to the polymerization of methacrolein within a glass tube, it is to be understood that the polymerization may be effected in other manners and particularly by any of the conventional casting techniques which operate effectively in conjunction with the polymerization of various liquid monomers. A typical casting procedure adapted for the cast polymerization of the methacrolein in concordance with this invention is that disclosed in the July 1956, issue of "Modern Plastics" under the title "Casting Plastic Sheets" by John Beattie. As disclosed in this article, casting cells may be prepared by sandwiching a flexible gasket between glass, with the gasket circumscribing a casting chamber for the polymerization castings of vinyl acetate, ethyl and methyl acrylates, acrylonitrile, and a variety of other commercially available monomers. Normally, in view of the rate of shrink of the polymerization mass, the glass plates are usually maintained under a continuing compression in which urge two plates together so as to maintain continuing pressure on the polymerizing mass.

For example, any of the reaction mixtures containing the stabilizer, as set forth in any examples given above, may be injected into the chamber defined by the glass plates and gasket of the casting cell and the polymerization permitted to proceed therein at any convenient temperature which is below the boiling pressure of methacrolein at the reaction pressures maintained by the casting cell. Alternatively, in order to accommodate for the shrinkage of the polymerizing mass of methacrolein (which is about 30%) the monomer may be converted to a polymer slurry prior to transfer to the casting. Thus the shrinkage is cut down, permitting easier control of the casting process.

It is noted that although the polymerization of methacrolein has only been described in conjunction with the use of catalysts and ultraviolet stabilizers, various other additives may be incorporated which are compatible with the resultant polymer. For example, fillers, pigments and dyes may be added to the compositions being cast for special effects.

The methacrolein polymers prepared by the process of the invention in the various examples given above are clear, transparent solids of high molecular weight having an inherent viscosity of between about 0.2 to about 2.0 and can be formed by mass polymerization or formed in films and sheets by any of the conventional casting techniques. These polymers are stable to ultraviolet light and do not degrade on prolonged exposure to ultraviolet light. The polymers prepared in accordance with this invention have a softening temperature of about 70° to below 84° C., and with the stability of the polymer maintained above 84° C, they can be readily formed and/or shaped into various desired configurations. The polymers have, normally, a Shore D hardness of 72 to 82, with a density of about 1.16 gms. per cc. These polymers have a high impact strength and some of them, especially the higher molecular weight ones, can be struck with a hammer without shattering. A number of the polymers obtained in accordance with this invention have had nails driven into them without cracking of the material. Sheets of these novel polymethacrolein obtained in accordance with this invention can be tooled with a saw, sealed with one another with solvents such as methylenechloride and fabricated in much the same way as polymethylmethacrylate. In addition the excellent optical properties of the polymethacrolein of this invention make it useful in the applications where other "organic glasses" are useful. Also, the polymethacrolein of this invention can be readily drilled to provide apertures for fasteners in attaching the polymer to supporting structures.

The pendent aldehyde groups provide extremely reactive points of reaction for modification of the polymer thus making the polymer particularly valuable as a chemical intermediate in the preparation of a wide variety of polymers. In general, the high strength and transparency and stability of the polymers makes them exceedingly useful in a host of industrial and consumer applications.

For purposes of comparison, it is believed that the following examples will more clearly contrast the characteristics of the polymers of this invention with those of the prior art.

Example V

Methacrolein was purified by distilling under a nitrogen atmosphere and employing a column with five theoretical plates and a receiver where the distillate could be held under nitrogen atmosphere. The distilled methacrolein was quickly transferred to small, glass containers sealed with tightly fitting caps, followed by mass polymerization of the methacrolein. After polymerization, the containers were opened and the contents found to have been converted to a colorless, transparent, hard solid having the following properties:

| | |
|---|---|
| Softening point under pressure _____° C__ | About 70–84 |
| Specific gravity | About 1.16 |
| Shore D Hardess | About 80 |
| A refractive index | About 1.54 |

Samples of this polymer were found to be soluble in ketone solvents such as acetone and in dimethylformamide, but insoluble in common hydrocarbon solvents such as xylene and heptane and appear to be unaffected by contact with water. The inherent viscosity of these polymer samples, in 0.5% solution in dimethylformamide measured at 35° C., range from about 0.1 to about 0.5.

Infrared examination of the polymer showed that a major portion of the aldehyde groups were essentially uncombined and indicated the absence of any substantial portion of acetal and/or hemiacetal structures.

Example VI

Methacrolein was purified by distillation in a spinning band fractionating column under a stream of argon. Fractions of various degree of purity were collected in sealed glass tubes. Purity of the individual fractions was estimated by means of glass-liquid partition chromatography. The fractions of highest purity were approximately 99.8% pure methacrolein. Each of the corresponding polymers (polymers corresponding to the separated fractions) were transparent, hard solids which were soluble in solvents, such as acetone and dimethylformamide, but insoluble in common hydrocarbons such as xylene and heptane. The inherent viscosity of these polymers range from about 0.1 to 0.5. As in Example V, infrared examination of the samples showed that a major proportion of the aldehyde groups were essentially uncombined and indicated the absence of any substantial proportion of acetal and/or hemiacetal groups.

Study of the thermal behavior of the polymer samples, devoid of the stabilizers of this invention, at atmospheric pressure reveals an irreversible transformation at about 84° C. to yield an opaque like solid. Infrared studies of such heated polymers showed strong bands at 9.2 microns, 10.1 microns, and 10.9 microns with an extremely weak carbonyl band of the usual aldehyde wavelength.

Studies of these polymers indicate that the polymers of Examples I to IV, when heated above 84° C. and up to at least 108° C., will have an absorption in the carbonyl region characteristic of aldehyde groups, with relatively no indication of bands at 9.2 microns, 10.1 microns, and 10.9 microns which are present in heated polymers such as those of Examples V and VI.

Although the invention has been described with references to specific materials, embodiments and details, various modifications and changes, within the scope of the invention, will be apparent to one skilled in the art and are contemplated to be embraced within the invention.

What is claimed is:

1. A transparent polymer composition characterized by:
   (a) an inherent viscosity in the range of about 0.2 to about 2.0 when measured as an 0.5% solution in dimethyl formamide at 35° C.;
   (b) a specific gravity of about 1.16;
   (c) a Shore D hardness of about 72 to about 82;
   (d) containing substantially all of the aldehyde groups in uncombined form, and being substantially free of acetal and hemiacetal structures as determined by infra-red absorption; and
   (e) solubility in dimethyl formamide, methylene chloride and ketone solvents and substantial insolubility in xylene, n-heptane, carbon tetrachloride and water;
   (f) a resistance to undergoing irreversible transformation when heated to a temperature of at least 120° C; and
   (g) remaining transparent on exposure to ultra-violet light for at least 18 hours in the Atlas "Weather-Ometer" and the exposure conditions specified herein;

said polymer composition comprising a homopolymer of methcrolein containing a stabilizer uniformly incorporated in said homopolymer in an amount of about 0.01 to 0.2% by weight of said homopolymer and comprising a substituted benzophenone having the formula

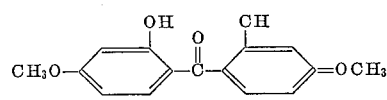

2. A transparent polymer composition comprising a homopolymer of methacrolein characterized by:
   (a) having a specific gravity of about 1.16,
   (b) having substantially all of the aldehyde groups in uncombined form and being substantially free of acetal and hemiacetal structures, as determined by infrared absorption,
   (c) being soluble in common ketone solvents and substantially insoluble in hydrocarbon solvents, and 2,2'-dihydroxy - 4,4' - dimethoxybenzophenone uniformly incorporated in said homopolymer in an amount of about 0.01 to 0.2% by weight of said homopolymer, said polymer composition being characterized by not undergoing an irreversible transformation when heated to a temperature up to 108° C., and which will remain transparent on exposure to ultraviolet light for at least 18 hours in the Atlas "Weather-Ometer" and the exposure conditions specified herein.

3. A transparent polymer composition comprising a homopolymer of methacrolein characterized by:
   (a) having a specific gravity of about 1.116,
   (b) having substantially all of the aldehyde groups in uncombined form and being substantially free of acetal and hemiacetal structures, as determined by infrared absorption,
   (c) being soluble in common ketone solvents and substantially insoluble in hydrocarbon solvents, and 2-hydroxy - 4 - methoxybenzophenone uniformly incorporated in said homopolymer in an amount of about 0.01 to 0.2% by weight of said homopolymer, said polymer composition being characterized by not undergoing an irreversible transformation when heated to a temperature up to about 108° C., and which will remain transparent on exposure to ultraviolet light for at least 18 hours in the Atlas "Weather-Ometer" and the exposure conditions specified herein.

4. A transparent polymer composition comprising a homopolymer of methacrolein characterized by:
   (a) having a specific gravity of about 1.16,
   (b) having substantially all of the aldehyde groups in uncombined form and being substantially free of acetal and hemiacetal structures, as determined by infrared absorption,
   (c) being soluble in common ketone solvent and substantially insoluble in hydrocarbon solvents, and 2-hydroxy-4-octoxybenzophenone uniformly incorporated in said homopolymer, said polymer composition being characterized by not undergoing a irreversible transformation when heated to a temperature up to about 108°

C., and which will remain transparent on exposure to ultraviolet light for at least 18 hours in the Atlas "Weather-Ometer" and the exposure conditions specified herein.

References Cited

UNITED STATES PATENTS

| | | | |
|---|---|---|---|
| 2,657,192 | 10/1953 | Miller et al. | 260—67 |
| 2,945,837 | 7/1960 | Eifert | 260—40.95 |
| 3,162,514 | 12/1964 | Roelen et al. | 260—67 |
| 3,293,210 | 12/1966 | Griffiths et al. | 260—45.95 |

DONALD E. CZAJA, *Primary Examiner.*

H. E. TAYLOR, *Assistant Examiner.*

U.S. Cl. X.R.

260—67